United States Patent [19]
Myers

[11] Patent Number: 4,890,210
[45] Date of Patent: Dec. 26, 1989

[54] POWER SUPPLY HAVING COMBINED FORWARD CONVERTER AND FLYBACK ACTION FOR HIGH EFFICIENCY CONVERSION FROM LOW TO HIGH VOLTAGE

[75] Inventor: Howard M. Myers, Greensboro, N.C.

[73] Assignee: Gilbarco, Inc., Greensboro, N.C.

[21] Appl. No.: 272,006

[22] Filed: Nov. 15, 1988

[51] Int. Cl.[4] .................................................. H02M 3/335
[52] U.S. Cl. .......................................... 363/21; 363/61
[58] Field of Search ................................ 363/20, 21, 61

[56] References Cited

U.S. PATENT DOCUMENTS

| | | | |
|---|---|---|---|
| 2,929,982 | 3/1960 | Gormley | 361/93 |
| 3,381,201 | 4/1968 | Angello | 363/20 |
| 3,395,313 | 7/1968 | Rogers | 315/308 |
| 3,401,272 | 9/1968 | Rosa et al. | 307/327 |
| 3,828,239 | 8/1974 | Nagai et al. | 363/20 |
| 4,109,306 | 8/1978 | Mason | 363/61 |
| 4,313,155 | 1/1982 | Bock et al. | 363/21 |
| 4,318,168 | 3/1982 | Faxon | 363/21 |
| 4,377,842 | 3/1983 | Cambier | 363/20 |
| 4,437,147 | 3/1984 | Takamura et al. | 363/61 |
| 4,438,485 | 3/1984 | Voigt | 363/21 |
| 4,481,564 | 11/1984 | Balaban | 363/21 |
| 4,495,554 | 1/1985 | Simi et al. | 363/21 |
| 4,499,532 | 2/1985 | Hudson et al. | 363/21 |
| 4,516,168 | 5/1985 | Hicks | 363/21 |
| 4,559,590 | 12/1985 | Davidson | 363/21 |
| 4,593,346 | 6/1986 | Nooijen et al. | 363/21 |
| 4,659,894 | 4/1987 | Inoue | 363/21 |
| 4,660,134 | 4/1987 | Geray et al. | 363/20 |
| 4,688,158 | 8/1987 | Peterson et al. | 363/21 |
| 4,709,316 | 11/1987 | Ngo et al. | 363/21 |
| 4,710,859 | 12/1987 | Rilly | 363/21 |
| 4,725,735 | 2/1988 | Ariel et al. | 363/21 |
| 4,725,936 | 2/1988 | Nakajima et al. | 363/21 |
| 4,731,720 | 3/1988 | Takahashi | 363/21 |
| 4,734,839 | 3/1988 | Barthold | 363/21 |
| 4,739,462 | 4/1988 | Farnsworth et al. | 363/21 |
| 4,766,528 | 8/1988 | Marinus | 363/21 |

Primary Examiner—Patrick R. Salce
Assistant Examiner—Jeffery L. Sterrett
Attorney, Agent, or Firm—Kenneth Watov; Stefan J. Klauber; David A. Jackson

[57] ABSTRACT

In a switching power supply including a step-up transformer having primary and secondary windings, wherein in each successive cycle of operation, during a first period of time a voltage pulse is applied across the primary winding for causing forward current in the secondary to flow through a shuttle capacitor and output capacitor connected in series with the secondary winding at this time, for charging the output capacitor to a voltage level approaching the voltage across the series circuit of the shuttle capacitor and secondary winding, and in an immediately following second period of time terminating the voltage pulse across the primary winding, and allowing flyback energy in the secondary winding to charge and be captured only by the shuttle capacitor for transfer to the output capacitor during the next cycle of operation.

23 Claims, 5 Drawing Sheets

POWER SUPPLY HAVING COMBINED FORWARD CONVERTER AND FLYBACK ACTION FOR HIGH EFFICIENCY CONVERSION FROM LOW TO HIGH VOLTAGE

FIELD OF THE INVENTION

The present invention relates generally to switching power supplies, and more particularly to such supplies that are pulse driven and provide load current in both the forward and flyback modes of operation.

BACKGROUND OF THE INVENTION

There are many prior switching power supply configurations for raising the level of a DC voltage from a relatively low level to a substantially higher level. For example, the Nagai et al., U.S. Pat. No. 3,828,239, discloses a high DC voltage generating circuit including a transistor 1 to alternately and successively connect and disconnect power to the primary winding 14a of a transformer 14. As shown in FIG. 4, two resonant circuits 19 and 21 are included in the primary circuitry of the voltage supply. Also, the output voltage from the secondary winding is applied to a voltage doubler rectifier circuit 16. A resonant frequency is chosen in conjunction with the switching frequency for the transistor 11 in order to cause a sinusoidal voltage to be developed across the secondary winding of the transformer 14. The relatively high amplitude sinusoidal voltage is passed through the voltage doubler rectifier circuit 16 connected to the output of the secondary winding 14b of transformer 14. When the primary winding is energized, the resonant circuits on the primary side generate a relatively high sinusoidal voltage, which is stepped up by the secondary winding 14b and applied to the voltage doubler rectifier to provide a substantially high DC voltage at output terminal 17. The required output voltage is in the order of 20,000 volts or more with a relatively low output current.

Rosa et al., U.S. Pat. No. 3,401,272, Rogers, U.S. Pat. No. 3,395,313, Angello, U.S. Pat. No. 3,381,201, and Gormley, U.S. Pat. No. 2,929,982 show other forms of switching power supplies.

Cambier, U.S. Pat. No. 4,377,842, discloses a flyback power supply including a switching transistor having a main current path connected in series with the primary winding of a transformer for charging the primary winding during turn on of the transistor, and causing discharge of the winding during turn off times of the transistor. As shown in FIG. 5, a damping circuit including the series connection of a resistor Rd and diode Sd, connected across the secondary of the flyback transformer provides for damping for oscillations caused by stray capacitances during switching of the transistor 14.

Simi et al., U.S. Pat. No. 4,495,554 discloses a switching power supply controlled by pulse width modulator 51 isolated from the output voltage by an isolation transformer 35. During the turn on time of a transistor 9 in the primary circuit, an inductor 5 is included as a storage element which ramps to a given current level during this time. When transistor 9 is turned off, some of the energy from the inductor 5 is transferred into the primary circuit of transformer 11. The inductor 5 incurs losses both during the turn on and turn off periods of the transistor 9, due to resistive and magnetic losses. The current driven into the primary winding during turn off of the transistor 9 is transferred to the secondary winding for charging capacitors 13 and 31. Over successive cycles of operation, the duty cycle of transistor 9 is controlled for obtaining a desired level of voltage across the output capacitor 31. Note that the secondary current at the turn off of transistor 9 is derived from the discharge of inductor 23 and current flow through diode 21, as a result of the negative voltage with respect to node C induced across the secondary winding at the time of turn off of transistor 9.

Davidson, U.S. Pat. No. 4,559,590 discloses a DC-DC converter including an inductor winding 21 in series with a capacitor 25, a primary winding 15, and a source of voltage 11. A first transistor switch 23 is connected between the common connection of the inductor 21 and capacitor 25 and the other end of the primary winding 15, for operating to shunt current away from this primary winding whenever the switch is turned on. A second switching transistor 26 is connected across the series combination of a capacitor 27 and another portion of the primary winding 16. A pulse width modulated controller is used to alternately turn on and off the two switching transistors. The combination of the inductor 21 and capacitor 25 in series with the primary winding 15 form a resonant circuit. Another resonant circuit is formed in the circuitry for secondary winding 17 via the parasitic inductor 19, capacitor 34, and capacitor 25 forming a series resonant circuit via inductive coupling between the secondary and primary windings. The switches 23 and 26 are alternately switched at a frequency and duty cycle that causes a sinusoidal voltage to be developed in the secondary 17 that is rectified to provide a DC output voltage across capacitor 13.

Nooijen et al., U.S. Pat. No. 4,593,346, discloses a switching power supply for providing two mutually independent output voltages across two secondary windings. The system relies on the transfer of voltage between the primary and secondary windings via resonant phenomenon, for providing sinusoidal currents in the secondary winding L2 (see FIG. 4). Series resonant circuitry is relied upon in each embodiment shown in this patent for transferring energy from the primary to the secondary windings of a power transformer.

Inoue, U.S. Pat. No. 4,659,894 discloses a switching power supply that includes the combination of a capacitor and diode in the secondary windings of a transformer. A capacitor of the power supply is remotely connected across a machining gap, and is connected to the remote power generator for charging the capacitor with pulses of a high-frequency electrical power. The capacitors are discharged across the machining gap for carrying out certain machining operations.

Geray et al., U.S. Pat. No. 4,660,134 discloses a DC-DC converter including the series connection of an inductor with a primary winding and capacitor between a source of voltage, a switching transistor connected across the combination of the primary winding capacitor, and full-wave bridge rectifier connected across the secondary winding of the transformer. The capacitor 28 is connected across interior nodes of the bridge rectifier, with a forward mode diode 26, connected within the bridge between the capacitor and one output diode 24. With reference to FIG. 2, during conduction of the chopper transistor 19, current flows through the secondary winding in the bridge diodes 24 and 25, through inductor 31, and output capacitor 32. With reference to FIG. 3, during non-conductive times of chopper transistor 19, current flows in the opposite direction through the secondary winding, through diode 22, into capacitor 28 (charging capacitor 28), through diode 23 and back to the secondary winding during an initial period of time after turn off of chopper transistor 19. The chopper transistor 19 is held non-conductive for a sufficient period of time that the charging current $I_1$ diminishes to the point that capacitor 28 begins to discharge for the remainder of the cut-off period of transistor 19 through diode 26 and inductor 31 to the parallel combination of a load 33 and output capacitor 32.

Peterson et al., U.S. Pat. No. 4,688,158 discloses a flyback power supply system including a conventional diode capacitor combination in the secondary of the flyback transformer, and a sample-and-hold circuit in the feedback circuit from the output of the power supply to the control system for holding the level of the feedback signal, during times of energy storage in the primary of the transformer.

Ngo, U.S. Pat. No. 4,709,316 discloses a switching mode DC-to-DC convertor. As shown in FIG. 1, the converter includes a switching transistor 13 connected in series with the primary winding 11 of a transformer 10, for periodically connecting a DC source across the primary winding. A resonant capacitor 15 is connected to the secondary winding for forming a resonant circuit with the parasitic inductances from the secondary winding 12. A diode 16 is connected across the combination of the capacitor 15 and secondary winding 12. The converters are operated below the resonant frequency of the capacitor 15 and parasitic inductance of secondary winding 12, whereby the control means 25 operates to turn FET 13 off at times that the current flowing through the transistor is substantially zero or of a very low magnitude due to resonant phenomenon. When FET 13 is so turned off, current will flow from secondary winding 12 through diode 16, and capacitor 15, for charging capacitor 15. When FET 13 is turned on, diode 16 is back biased and capacitor 15 discharges into the filter circuit 17. Zero current switching in the transistors is obtained via the use of the resonant capacitor connected in series with the transformer secondary.

Rilly, U.S. Pat. No. 4,710,859 discloses a switching power supply of the DC-to-DC converter type, which as shown in FIG. 1 includes a peak-to-peak rectifier 45 connected across the secondary winding of a transformer 5. A forward diode 47 is conducting during the on-time of a switching transistor 9, to charge a first capacitor 46 to a voltage proportional to the level of the supply voltage V1. A flyback diode 48 is conductive during the off-time of transistor 9, and back biasing of a shunt diode 13, for discharging a capacitor 46 and charging another capacitor 49 to a voltage proportional to the peak-to-peak value $V_{pp}$ of the collector-to-emitter voltage $V_{CE9}$ of the switching transistor 9. The turns ratio of the step-up transformer 5 determines the proportionality of the primary voltage relative to the secondary voltage.

Ariel, et al., U.S. Pat. No. 4,725,735, discloses a power supply that includes a free-running multivibrator for applying low pulse rate repetition square wave pulses to the primary of a transformer T1. The resulting voltage developed in the secondary T1 is passed through a voltage doubler circuit including capacitors C3, C4, C5, and diodes D4, D5, and D6 for providing a DC output voltage to charge capacitors C11 and C6.

Nakajima et al., U.S. Pat. No. 4,725,936 teaches a DC-DC converter including a resistive voltage divider for dividing down the level of the output voltage for providing a feedback signal to a pulse width modulated signal generator circuit 15, for controlling the pulse width of the control signal from the PWM 15. This control signal is applied to a switching transistor 12 connected in series with the primary of a transformer 11.

SUMMARY OF THE INVENTION

An object of the invention is to provide an improved switching power supply.

Another object of the invention is to provide an improved switching power supply for producing a 175.0 volts DC from a nominal 12.0 to 15.0 volt DC supply.

Another object of the invention is to provide a new switching power supply having an efficiency approaching 90%.

Another object of the invention is to substantially reduce losses due to snubber circuitry.

Another object of the invention is to capture and utilize the energy developed in bi-directional voltage swings of the secondary voltage for developing a desired level of output voltage in an improved switching power supply.

Yet another object of the invention is to provide an improved switching power supply with a reduced turns ratio in the switching transformer, for reducing resistive losses in the secondary winding of the transformer.

These and other objects of the invention are obtained in a new switching power supply including a switching circuit for applying a pulse voltage across the primary winding of a transformer for a first period of time, for causing forward current flow in the secondary winding of the transformer which is passed through the series combination of a shuttle capacitor and output capacitor connected in series across the secondary winding during this first period of time, for both supplying current to a load and charging the output capacitor to a voltage level approaching the voltage across the series combination of the shuttle capacitor and secondary winding. The voltage across the primary winding is terminated for a second period of time during each cycle of operation, for causing the resultant flyback energy developed in the secondary winding to charge the shuttle capacitor to a voltage approaching the peak voltage of the flyback voltage. Over successive cycles of operation, in which each cycle includes the first and second successive periods of time, the output capacitor is charged to a desired voltage level. Closed loop control means are used to sense the level of the output voltage across the output capacitor at any given time for setting the length of the first period of time in each cycle of operation, for maintaining the level of the output voltage at a desired level.

BRIEF DESCRIPTION OF THE DRAWINGS

A detailed description of the invention follows with reference to the drawings in which like items have the same reference number, as follows.

DETAILED DESCRIPTION OF THE PREFERRED EMBODIMENTS

Figure 1:
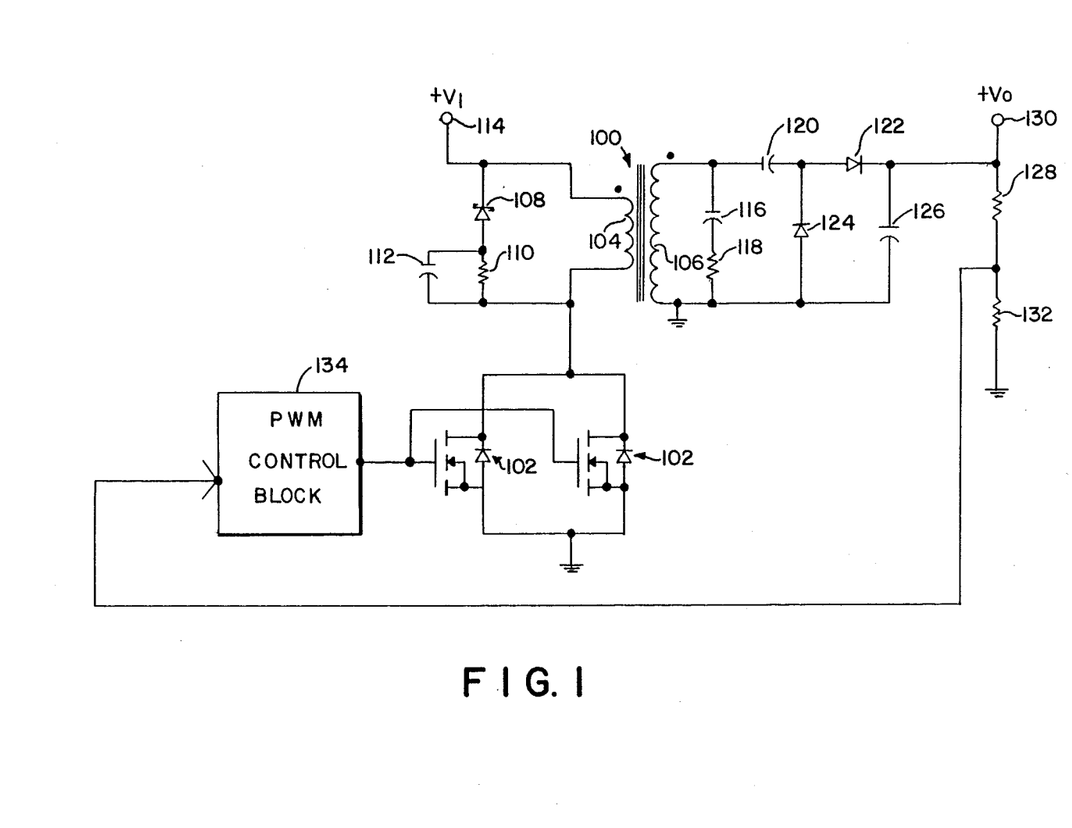
FIG. 1 shows a block-schematic diagram of a first embodiment of the invention.

In FIG. 1, the present new switching power supply configuration is shown in block schematic form, for providing a basic explanation of the principles of operation of the present invention. A more detailed description is given below. The present inventor discovered that through use of the new switching configuration, efficiencies of 80% to 90% were obtained, whereas prior switching power supplies were found to have switching efficiencies of about 70%. As will be explained, the present invention permits flyback energy that is typically snubbed in prior circuits to be converted into electrical energy for delivery to a load. In this manner, the efficiency of the present switching power supply is substantially increased over known prior switching power supplies. Also, through such practical use of a substantial portion of the flyback energy the turns ratio for the switching transformer 100 was reduced from a secondary to primary turns ratio of 14, to a ratio of 7, thereby reducing resistive losses in the secondary winding of transformer 100. Also, by providing an active switch from the parallel combination of two MOS field effect transistors 102, the impedance of the current path provided between the non-polarized end of the primary winding 104 and a source of reference potential, ground in this example, is reduced by approximately 50%, resulting in a reduced power dissipation of about 75% in comparison to using a single switching transistor 102.

As shown, the new switching power supply configuration includes a polarized switching transformer 100, having a primary winding 104, and a secondary winding 106. A snubber circuit including a Schottky diode 108 connected in series with the parallel combination of a resistor 110 and capacitor 112, is connected across the primary winding 104 as shown. The snubber circuit is designed only to provide the level of snubbing required to protect the field effect transistors 102 during the flyback mode of operation. The dot or polarized end of the primary winding 104 is also connected to a voltage terminal 114 for receiving, in this example, a source of positive voltage having a level of +12.0 volts DC. In the secondary winding 106 circuit a high-frequency filter including the series combination of a capacitor 116 ad resistor 118 is connected across the secondary winding 106, as shown. The non-polarized end of the secondary winding 106 is terminated to ground, in this example. The dot or polarized end of the secondary winding 106 is connected to one end of a shuttle capacitor 120, the other end of which is connected to the common connection of the anode of a diode 122 and cathode of another diode 124. The anode of diode 124 is terminated to ground, whereas the cathode of 122 is connected to one end of an output capacitor !26, and to one end of a resistor 128, and an output terminal 130, as shown. The other end of capacitor 126 is terminated to ground. Resistor 128 is connected in series with a resistor 132, which is terminated to ground. The series combination of resistors 128 and 130 provide a voltage divider for providing a feedback signal to a pulse width modulator control block 134. This feedback signal is proportional to the level of the output voltage appearing between output terminal 130 and ground (also across output capacitor 126).

In this illustration, the output voltage $+V_0$ is typically +175.0 volts, whereas the source voltage $+V_1$ is plus 12.0 volts DC.

The combination of capacitors 120 and 126, and diodes 122 and 124, appear to be a simple voltage doubler circuit driven by the secondary winding 106 of a switching transformer 100, where the primary winding 104 is driven by pulsed voltages via switching transistors 102 controlled by a pulse width modulator control block 134. However, the present configuration as designed, and the method of operation therefore, are unlike known prior switching power supply configurations, as will be explained below.

The operation of the present invention provides a hybrid forward/flyback converter, for in this example converting a DC input voltage $+V_1$ to a substantially higher level DC voltage $+V_0$. In this illustration, the output voltage $+V_0$ is approximately fifteen times greater than the level of the input voltage $+V_1$. During a first period of time in each cycle of operation, the switching or field effect transistors 102 are turned on, causing current to flow from the voltage source $+V_1$ through the primary winding 104, and parallel connected main current paths (between the drain and source electrodes) of transistors 102 to ground. As a result of the flow of current into the dot or polarized end of primary winding 104 at this time, current flows out of the dot or polarized end of the secondary winding 106, and through the series combination of capacitors 120 and 126, and diode 122, thereby charging capacitor 126 to have a positive voltage thereacross with respect to ground. During this first period of time in each cycle of operation, the mode of operation is that of a forward convertor.

The length of the first period of time is determined by the pulse width modulator control block 134, in response to the level of the feedback voltage from the voltage divider circuit 128, 132. The duty cycle or length of the first period of time in each cycle is increased via controller 134, in response to decreases in the output voltage $+V_0$ below a desired level. In other words, in this example, the pulse width of the voltage pulse supplied across the primary winding is representative of a first period of time in each cycle of operation, and is inversely proportional to the deviations in the output voltage $+V_0$ from a desired level of voltage. Accordingly, the pulse width modulator control block 134 terminates the first period of time in each cycle, for turning off transistors 102, causing the impedance of their main current paths to substantially increase in a step-like manner, causing the primary current to cease in a step-like manner. Substantially at the instant in time when the current through the primary winding 104 is so terminated, a flyback mode of operation is initiated for a second period of time in each cycle of operation, causing a negative voltage to appear across the secondary winding 106. The flyback or negative voltage causes current to flow through the series combination of diode 124, capacitor 120 and secondary winding 106. A substantial portion of the flyback energy or flyback voltage pulse is used to charge capacitor 120, causing a voltage to develop thereacross that is positive with respect to the common connection between capacitor 120, and diodes 122 and 124, and approaches in level the level of the negative flyback pulse developed across secondary winding 106 during this second period of time.

During the next cycle of operation, in the next first period of time during which transistors 102 are turned on for applying voltage across primary winding 104, as previously described, current again flows through the secondary winding and capacitors 122 and 126, and diode 122 as previously described. Capacitor 126 is charged during this time to a level approaching that of the voltage appearing across the series combination of capacitor 120 and the primary winding 106. By operating the present switching power supply in an iterative manner over successive cycles of operation, the output voltage $+V_0$ is maintained at a desired level for a range of load impedances connected to output terminal 130.

In the present invention, by storing the flyback energy in capacitor 120, as described, this energy is transformed into an additional voltage source for the forward converter operation of the power supply, for improving the efficiency of the present supply relative to known prior forward converters. The flyback energy is directly utilized by a load connected to output terminal 130, thereby avoiding losses associated with snubbers located in the primary circuit of transformer 100. In addition, losses associated with resetting the transformer core, as typically required in many known forward converters, are avoided.

Another benefit of the present invention is that since the output voltage $+V_0$ is the result of charging output capacitor 126 with energy from both the forward converter action during the first period of time, and the flyback action during the second period of time in each cycle, the voltage that would be typically required to be developed across the secondary winding 106 is reduced. Accordingly, in comparison to prior switching power supplies, the present invention permits use of fewer turns in the secondary winding for obtaining a desired level of output voltage $+V_0$. As a result, a larger wire size can be used in the secondary winding 106 without increasing the size of transformer 100 relative to prior switching power supply configurations, for decreasing the resistive losses in the secondary winding 106. Accordingly, the efficiency of the present switching power supply is higher than that of conventional flyback or forward converter power supply configurations due to the increased efficiencies obtained, and to the utilization of energy normally lost in the primary snubber, as previously mentioned.

Figure 2:
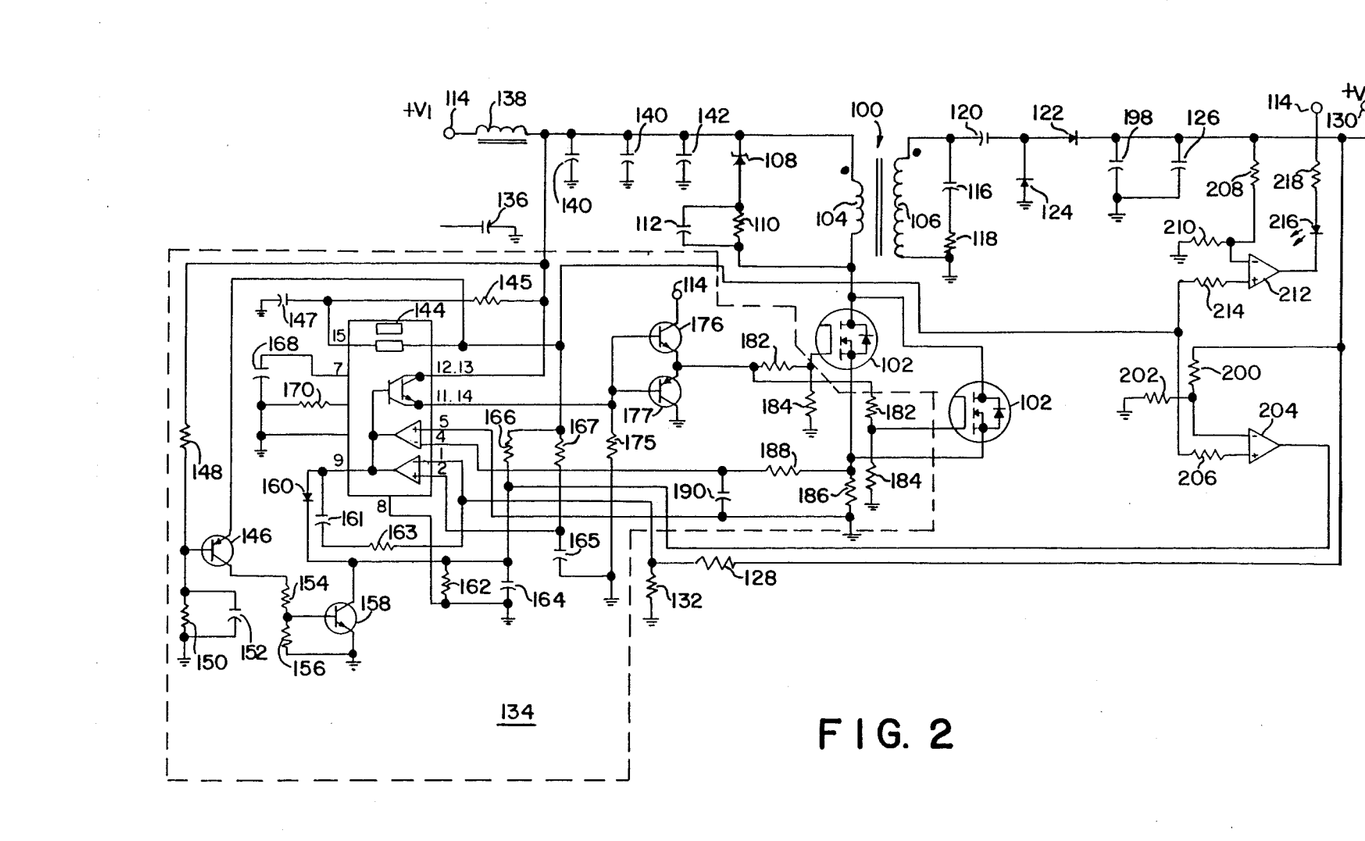
FIG. 2 shows a detailed schematic diagram of a preferred embodiment of the invention.

In FIG. 2, a preferred embodiment of the invention is shown for providing a new form of switching power supply for converting a DC voltage $+V_1$, ranging from about $+10.5$ volts DC to $+15.0$ volts DC, to an output voltage $+V_o$ having a level of about $+175$ volts DC, in this example. At the time of initiating operation of the circuit of FIG. 2, assume that all capacitors are discharged, and that the output voltage $+V_O$ is at zero volt. To initiate operation, the relatively low level of DC voltage $+V_1$, as previously described, is applied to input terminal 114. The input voltage $+V_1$ is filtered in this example by high frequency bypass capacitor 136, inductor 138, and capacitors 140, and 142, as shown. The latter filtering is of a commonly known configuration.

An integrated circuit controller 144 (in this example a 2524A "Regulating Pulse Width Modulator" (manufactured by Unitrode Corp., Lexington, Massachusetts) develops a $+5.0$ volt DC reference at pin 16, which is connected to the emitter electrode of PNP transistor 146, as shown. Resistors 148 and 150 form a series resistive voltage divider circuit for dividing the input voltage $+V_1$ down to a bias voltage level for connection to the base electrode of transistor 146. Note that capacitor 152 is a high frequency by-pass capacitor. The bias voltage provided at the base of transistor 146 is such that this transistor functions as a level detector for the input voltage $+V_1$. Transistor 146 conducts for a range of input voltages below $+10.0$ volts, and ceases to conduct for input voltages greater than $+10.0$ volts. Whenever transistor 146 is so conducting, current is supplied from its collector electrode to the resistive voltage divider formed by resistors 154 and 156. The voltage developed across resistor 156 causes base current to flow in NPN transistor 158, for turning on this transistor. In this manner, a soft-start is insured whenever the power supply circuit is turned on by applying an input voltage $+V_1$ to terminal 114. The soft-start operation is described in greater detail below, and is particularly beneficial for compensating for some changes in the level of the supply voltage $+V_1$, caused by power dropouts, and other disruptions in the level of $+V_1$.

Figure 3:
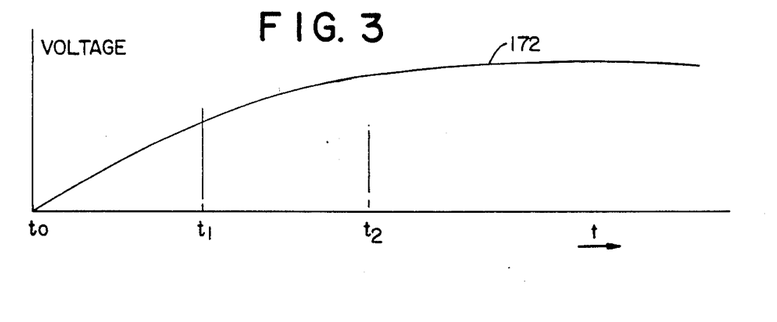
FIGS. 3 through 13 are waveform charts for use in explaining the operation of the embodiment of the invention of FIG. 2.

Also included in providing the soft-start function are diode 160, resistor 162, capacitor 164, and resistor 166. During normal operation, the voltage at pin 9 of control chip 144 causes a longer duration of time for the first period of each cycle of operation, that is during turn on of the field effect transistors 102. During start-up, the voltage on capacitor 164 slowly rises from 0 volt at a rate controlled by the resistance values of resistors 162 and 166. FIG. 3 illustrates the voltage waveform developed across capacitor 164 from initiation of operation of the power supply at time $t_0$, to time $t_2$ where the voltage stabilizes at a final value (about 2.0 volts, in this example). The time period between the times $t_0$ and $t_1$ in FIG. 3 represent the time constant established by the values of resistors 162 and 166, and capacitor 164 (approximately 0.1 second, in this example). Diode 160 clamps the voltage at pin 9 to the slowly rising voltage across capacitor 164, thereby limiting the initial duty cycle. Also, at initiation of operation of the present power supply, a ramp voltage is developed across capacitor 168 connected between pin 7 of controller 144 and ground. Note also for controller 144 that pin 6 is terminated to ground via resistor 170, and pin 10 is directly connected to ground. As the voltage across capacitor 164 rises, it eventually reaches a final value that is high enough to not effect subsequent normal operation of the present power supply (see FIG. 3).

Figure 4:
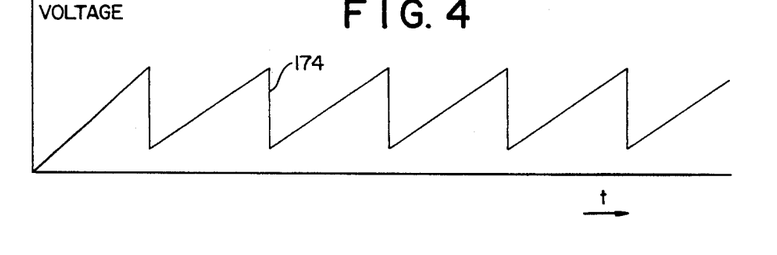
Figure 5:
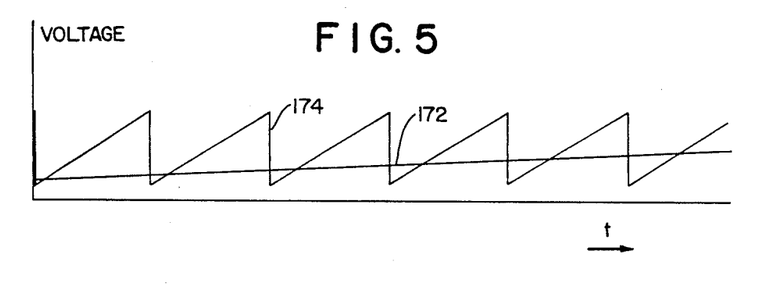
Figure 6:
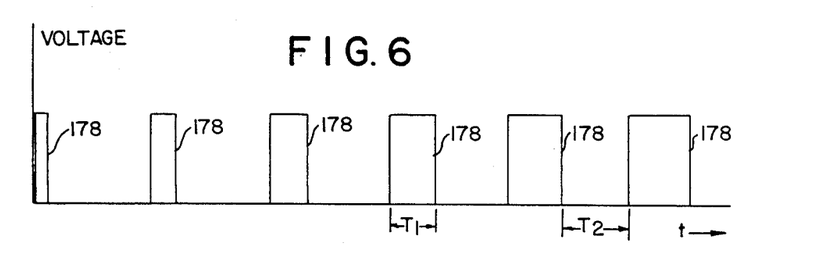
Figure 7:
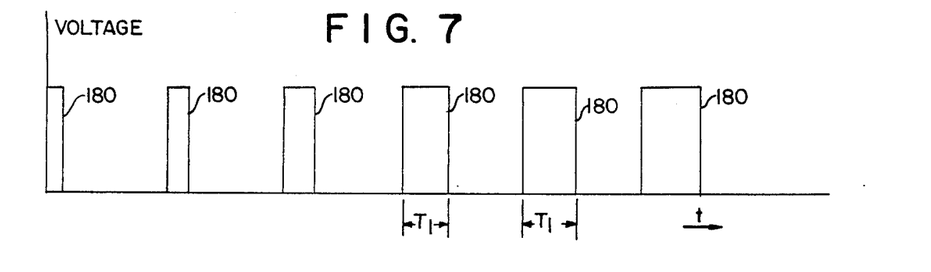

Normal operation is entered into after the period of soft-start has expired. During such normal operation, controller 144 provides a ramp signal 174 internal to controller 144, whose characteristics are established via the values of timing capacitor 168 and timing resistor 170. In this example, as shown in FIG. 4, the ramp voltage 174 has a time period of about 20.0 microseconds, a minimum amplitude of about $+0.8$ volt and a maximum amplitude of about $+3.5$ volts. In other words, the ramp voltage 174 is referenced above ground, as shown. As shown in FIG. 5, the ramp voltage 174 is compared to the level of voltage 172 at pin 9 via circuitry internal to controller 144. The result of this comparison by controller 144 establishes the length of time for the first period of time $T_1$, during which NPN transistor 176 and the pair of field effect transistors 102 are turned on. As a result of this comparison, positive-going pulses 178 are produced at pins 11 and 14 of controller 144, as shown in FIG. 6 The width of these pulses 178 represent the first period of time. Transistor 176 operates to raise the level of pulses 178, for providing gate pulses having a level of from 10.0 to 15.0 volts at the gate electrodes of field effect transistors 102, respectively. The gate voltage pulses 180 are shown in FIG. 7, and are similar in width $T_1$ to the corresponding ones of the pulses 178 in FIG. 6. Note that the gate electrodes of field effect transistors 102 are each connected to the common connection of resistive voltage dividers formed by a pair of resistors 182 and 184, respectively, as shown in FIG. 2. Accordingly, the width of the pulses 180 establish the period of time $T_1$ that the field effect transistors 102 are turned on, and therefore the duration of time for primary current to flow in the primary winding 104 of transformer 100. Note that the magnitude of the current flowing through the primary is analogous to the voltage developed across resistor 186 connected between the source electrodes of field effect transistors 102 and ground. This voltage is filtered by the low pass filter formed by resistor 188 and capacitor 190, and connected to pin 4 of controller 144, the latter being operative to shut down the present power supply if the magnitude of the current flowing through the primary winding 104 exceeds a predetermined magnitude.

Figure 8:
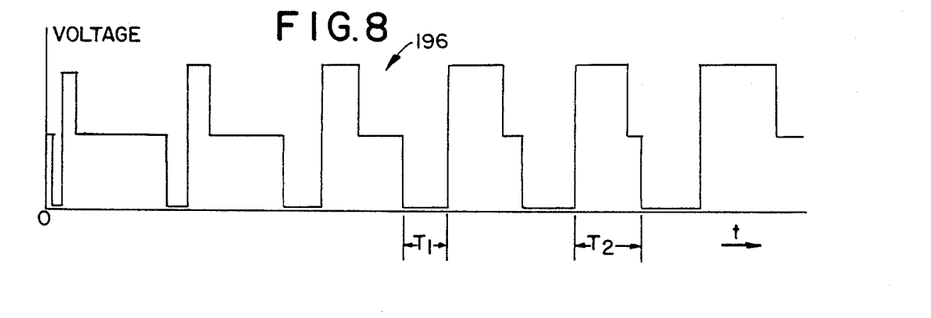
Figure 9:
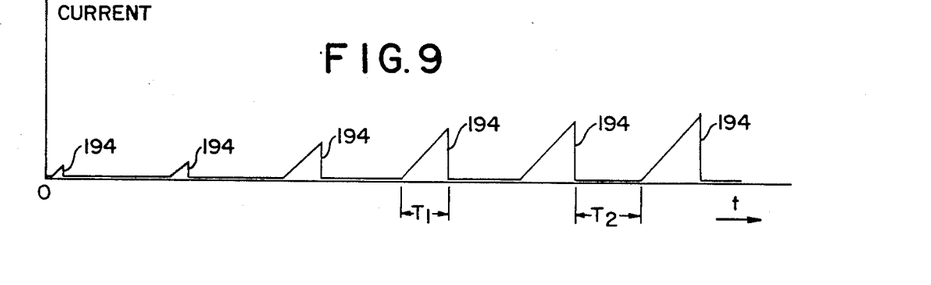
Figure 10:
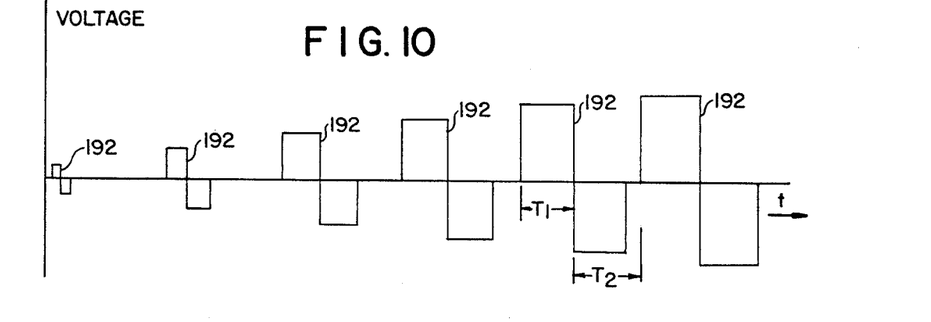

The secondary winding 106 of transformer 100 develops a voltage waveform 192 as shown in FIG. 10 over successive cycles of operation. This voltage waveform 192 is similar to the waveform developed across the primary winding 104, but is amplified by the secondary to primary turns ratio, which as previously mentioned is 7:1, in this example. During the first periods of time $T_1$ in each cycle of operation, that is during the turn on times of field effect transistors 102, current flows into the dot or polarized of primary winding 104, and out of the dot or polarized end of the secondary winding 106, as previously mentioned. Also, as previously described, the secondary current flows through shuttle capacitor 120, diode 122, and output capacitor 126, causing a positive voltage to be developed across capacitor 126. This operation is representative of forward converter action, whereby load current is supplied from output terminal 130 at times that primary current 194 (see FIG. 9) is flowing. FIG. 8 shows the voltage waveform 196 at the drain electrodes D of field effect transistors 102. Note that in comparison to the gate voltage pulses 180 shown in FIG. 7, that the drain voltage of transistors 102 is substantially at ground at times that the corresponding gate voltage 180 is at a positive level.

As previously described, when field effect transistors 102 are turned off at the end of each first period of time, in each cycle, the primary current is terminated. Controller 144 terminates the first period of time by grounding the base electrodes of transistors 176 and 177, causing transistor 176 to turn off and transistor 177 to turn on. When transistor 177 turns on, it connects the gate electrodes of FET's 102 to ground, turning the latter off. This initiates the second period of the cycle, $T_2$ during which flyback occurs. Note that resistor 175 is a grounding resistor for the base electrodes of transistors 176 and 177. The collapsing magnetic field in the primary winding 104 causes the voltage at the drain electrodes D of transistors 102 to rise very quickly (see FIG. 8), and also causes the polarized or dot end of primary winding 104 to fall very quickly in the flyback mode of operation. The resulting flyback energy in the secondary winding is in effect captured by shuttle capacitor 120 through its connection in the series circuit formed with diode 124 in secondary winding 106, as previously described.

As shown in FIG. 10, the voltage 192 across the secondary winding 106 has a negative voltage magnitude in the flyback mode of operation that is approximately equal in magnitude to the level of the voltage across the secondary winding 106 during the forward converter mode of operation, in this example. In this illustration, the secondary voltage 192 eventually attains a level of about $+85.0$ volts DC in the forward mode of operation, and accordingly a level of about $-85.0$ volts DC in the flyback mode of operation, as shown. From the initiation of turn on of the present power supply, these levels of voltage are reached after a number of cycles of operation of the supply. Accordingly, shuttle capacitor 120 charges to a level for developing a positive voltage thereacross that is approximately equal in magnitude to the level of the negative voltage developed across secondary winding 106 as a result of the flyback mode of operation (see FIG. 10). Note that this flyback mode of operation occurs during a second period of time $T_2$ of each cycle of operation immediately after the first period of time in a given cycle.

During the next cycle of operation, in the first period of time $T_1$, the sum of the voltages across the secondary winding 106 and capacitor 120 provide charging current via diode 122 to output capacitor 126, as previously described. Note that capacitor 198 is a high-frequency bypass filter for filtering any high-frequency signals that develop in the charging of capacitor 126. During each successive cycle of operation, output capacitor 126 maintains the level of the output voltage $+V_0$ and supplies current to a load connected to output terminal 130 during the flyback mode or second period of time $T_2$ of each cycle of operation. Also, at this time shuttle capacitor 120 is recharged. During the forward converter mode of operation or each first period of time of each cycle, output capacitor 126 is recharged, with the power supply continuing to provide current to a load connected to output terminal 130, and to maintain the output voltage $+V_0$ at the desired level.

The common connection of the voltage divider formed by resistors 128 and 132 provides a feedback signal voltage to controller 144. The controller 144 compares the $+5.0$ volt DC reference voltage developed at pin 16 to the feedback signal for maintaining the present duty cycle if the output voltage $+V_0$ is at the desired level, increasing the duty cycle if this voltage is below the desired level, or decreasing the duty cycle if this voltage happens to rise above the desired level. Note that resistor 167 connects the reference voltage to pin 2 of controller 144, and capacitor 165 is a high-frequency bypass for the reference voltage at pin 2. Also note that resistor 145 couples $+V_1$ to pin 15 of controller 144, and capacitor 147 is a high-frequency bypass between this pin and ground.

The error signal developed at pin 9 of controller 144 is compared to the internal ramp signal 174 by controller 144. As a result of this comparison, the widths of the pulses 178 are controlled as shown in FIG. 6, for example. Note that pins 9 and 1 of controller 144 are connected together via the series circuit of capacitor 161 and resistor 163.

Another feedback path is provided by the resistive voltage divider formed by resistors 200 and 202, and voltage comparator 204. The voltage from the resistor divider 200,202 is representative or proportional to the level of the output voltage $+V_0$, and is connected to the inverting terminal of comparator 204. The non-inverting terminal of comparator 204 is connected via input resistor 206 to pin 16 of controller 144 for receiving the reference voltage at that pin (+5.0 volts, in this example). When the voltage at the inverting terminal is greater than the voltage at the non-inverting terminal of comparator 204, the output of this comparator is clamped to ground for reinitiating the soft-start operation (capacitor 164 is discharged). This additional feedback circuit is a failure detecting circuit for shutting down the power supply in the event of an over-voltage condition developing because of a fault in the voltage feedback loop controlling the duty cycle or period of turn on of field effect transistors 102 in each cycle of operation.

Another voltage monitor is provided by the combination of the voltage divider formed by resistors 208 and 210, and comparator 212. The voltage developed across divider resistor 210 is connected to the inverting terminal of comparator 212, and the non-inverting terminal thereof is connected via input resistor 214 to the reference voltage at pin 16 of controller 144. Whenever the level of the voltage at the inverting terminal exceeds the voltage at the non-inverting terminal of comparator 212, the output of this comparator is clamped to ground. When this occurs, the cathode electrode of LED 216, connected to the output of comparator 212, is clamped to ground, permitting current to flow from the source of input voltage $+V_1$ through the series combination of resistor 218 and LED 216, to ground, whereby LED 216 emits light for indicating that the level of the output voltage $+V_0$ is above a minimum predetermined level. Also, note that the previously mentioned high-pass filter provided by the series combination of capacitor 116 and resistor 118 across the secondary winding 106 provide a shunt for high-frequency ringing across the secondary winding, thereby reducing high-frequency emissions at the output terminal 130.

As previously mentioned, a snubber circuit formed by Schottky diode 108, and capacitor 112, and resistor 110 across primary winding 104, protect the MOSFETs 102 from excessive voltage. When these transistors 102 turn off, the resultant flyback effect causes the voltage at the drain electrodes D to rise rapidly. The positive voltage spike is clamped via the action of diode 108 and capacitor 112. During each first period of time $T_1$ of each cycle, that is during the time in each cycle that transistors 102 are turned on, resistor 110 discharges capacitor 112 in preparation for the next occurring flyback pulse in the following second period of time $T_2$ of the given cycle of operation.

Typically, snubbing on the primary side of a switching transformer must dissipate a relatively high level of power because of the large amount of energy released in the primary winding during the occurrence of the flyback pulse. In the present invention, a minimal amount of energy is dissipated in the primary side snubber 108, 110, 112, because a major portion of the flyback energy is captured by the shuttle capacitor 120 on the secondary side of transformer 100. This feature provides better utilization of the energy released in the present power supply system, relative to prior systems, resulting in an increase in the overall efficiency of the present power supply compared to prior switching power supplies. Also, the provision in the present switching power supply for charging output capacitor 126 during each first period of time $T_1$ in each cycle of operation with the energy developed in the shuttle capacitor 120 being additive to the energy developed in the secondary winding 106, provides a number of benefits. These benefits, some of which have been previously mentioned, permit fewer turns to be used for the secondary winding 106.

In the present example, typical prior switching power supplies for converting a relatively low DC voltage, such as 12.0 volts to a substantially higher voltage, such as +175.0 volts DC, would require a secondary to primary turns ratio of about 15:1, whereas in the present switching power supply a 7:1 ratio can be used for obtaining the same output voltage $+V_0$. As a result, relative to such prior supplies, in the present switching power supply the size of the wire used in the secondary winding 106 can be made substantially larger without increasing the size of the transformer, resulting in relatively lower resistive losses in the winding.

Another advantage is that since the flyback energy is captured and utilized in the secondary or load circuit in the present switching power supply, the developed energy is much more efficiently used in the present system than in prior systems, which as previously explained return a substantial portion of the flyback energy to the snubber circuit in the primary section of the power supply. Also, there is no need for a separate winding in transformer 100 for resetting the core, as is typically done in prior forward converters.

Another advantage of the present switching power supply, is that unlike typical prior switching power supplies in which the leakage inductances substantially contributes to losses which cannot be reclaimed, the present power supply utilizes leakage inductances on the secondary side for contributing to the flyback energy which is captured via shuttle capacitor 120. Note that leakage inductance is typically defined as that inductance which does not couple the primary winding to the secondary winding.

In the present switching power supply, a gap is provided in the transformer core. The gap permits additional magnetic energy storage, which contributes to the flyback energy used to charge shuttle capacitor 120 during the flyback mode of operation, and to subsequently charge output capacitor 126 in the forward converter mode of operation.

Another efficiency increase is obtained in the present switching power supply via the parallel connection of the MOSFET transistors 102, for providing the active switch to initiate and terminate the flow of current through primary winding 104. By connecting the transistors 102 in parallel, the total impedance between the drain D and source S electrodes of the parallel combination is approximately halved relative to the impedance of each transistor 102 alone, resulting in a reduction in the power dissipated in each transistor 102 by about ½. If only an individual one of the field effect transistors 102 was employed, approximately four times as much power would be dissipated in that field effect transistor relative to the parallel combination of the field effect transistors 102. Accordingly, by paralleling the field effect transistors 102, greater efficiency is obtained due to the reduced losses, and the resultant reduced heating of the field effect transistors 102 increases the reliability of the overall switching circuit formed by these transistors 102, relative to using only one such transistor 102.

Normal operation of the present switching power supply is initially attempted when it is powered up under conditions of a shorted load, that is when output terminal 130 is substantially connected to ground via a shorted load connected to this terminal. Under such a shorted load start-up condition, ramping begins in the soft-start circuitry as previously described. Field effect transistors 102 are switched on, and current begins to flow in the primary winding 104, as a result. The shorted load is reflected through the transformer 100 to the primary side, and as a result the current will rise at a faster rate than normal in the primary winding 104. The current sensing resistor 186 will quickly develop a proportional voltage due to the rapid rise in the magnitude of the primary current. The controller 144 will detect the magnitude of the primary current exceeding a predetermined limit, and immediately terminate the first period of time in the cycle, for turning off MOSFET transistors 102. The flyback mode of operation immediately occurs, and causes the voltage at the drain electrodes D of FET's 102 to go positive, whereas the voltage across the secondary winding 106 will go negative, as previously described. As a result the shuttle capacitor 120 will acquire a small charge, but less than in normal operation due to the reduced turn on time of transistors 102. As long as the shorted load condition remains, the present switching power supply will continue to cycle with very short duty cycles, preventing any damage to the circuitry.

The present switching power supply functions over a wide range of load impedances. A relatively high load impedance correspondingly results in a low magnitude output current, and normal operation is maintained. The previously described normal voltage feedback operation controls the duty cycle over each cycle of operation. Such normal operation will continued uninterrupted as the output current is increased (load impedance decreases) towards a full load condition.

When such a full load condition is attained, the current flowing through the MOSFETS 102 and primary winding 104 attains a maximum magnitude. The peaks of current magnitude flowing through the sensing resistor 186 are close to but below the current sense threshold. This threshold is set by the value of resistor 186 to prevent the occurrence of a magnitude of current large enough to saturate the core of transformer 100. If such core saturation does occur, the magnitude of the primary current will increase faster than during normal operation in the forward mode. Accordingly, the size of the core, its material, and other characteristics for transformer 100 must be chosen in consideration of the required power level for the switching power supply.

Output capacitor 176, as previously described, supplies output current during the flyback mode of operation. The ripple voltage developed at the output terminal 130 depends mainly on the size of the output capacitor 126, and the magnitude of the load impedance. In this illustration, the shuttle capacitor 120 and output capacitor 126 are equated in both capacitance and voltage rating. The shuttle capacitor 120, as previously explained, stores the flyback energy and must be large enough to not lose an excessive amount of charge (reduction in voltage thereacross), when the forward mode of operation begins. During the forward mode of operation with the transistors 102 turned on, the current flowing secondary winding 106 flows through shuttle capacitor 120 in a direction which tends to discharge this capacitor 120. If the shuttle capacitor 120 is a small capacitor, the forward mode of operation will substantially discharge this capacitor, greatly reducing the voltage thereacross and accordingly reducing the contribution from shuttle capacitor 120 for providing current to the load, and maintaining the voltage across the load. It is interesting to note that the system of U.S. Pat. 4,593,346, described above, includes a small capacitor for the secondary coupling, and a larger capacitor for the output capacitor.

Figure 11:
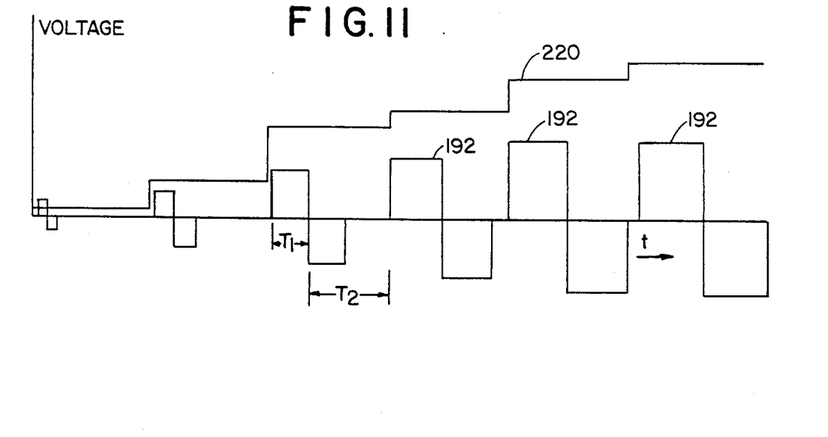

Note that during the previously described start-up operation for the present switching power supply, that in each successive forward convertor mode of operation (in each successive cycle) the gate voltage pulses of MOSFET transistors 102 become increasingly wider, as shown in FIG. 7. In other words, $T_1$ becomes increasingly wider. Also note, with reference to FIG. 8, that the drain voltage 196 during the flyback mode of operation becomes increasingly less step-like with each successive operation, or cycle of operation. In other words, $T_2$ becomes narrower. With reference to FIG. 9, during the start-up cycles of operation, the primary current 194 becomes increasingly greater in magnitude and duration with each successive cycle of operation, that is forward mode operation, during the start-up period. Similarly, as shown by FIG. 10, the secondary voltage 192 with each cycle of forward operation $T_1$ becomes increasingly greater in positive voltage level and in width over each successive cycle of forward operation, and increasingly greater in negative level and pulse width with each successive flyback mode of operation over the start-up period. As shown by FIG. 11, the voltage waveform 220 showing the increase in voltage across the output capacitor 126 over each cycle of the start-up period of operation, shows that this voltage build-up occurs in steps until the desired level of voltage is reached (+175.0 volts DC in this example). Also note that the waveform 192 represents the voltage across the secondary winding 106 over each successive cycle of operation during the start-up period, and that for each forward mode of operation in each cycle, the difference in amplitude between the secondary voltage at that time and the resultant level of voltage across output capacitor 126 is the contribution to this voltage from the flyback mode of operation.

Figure 12:
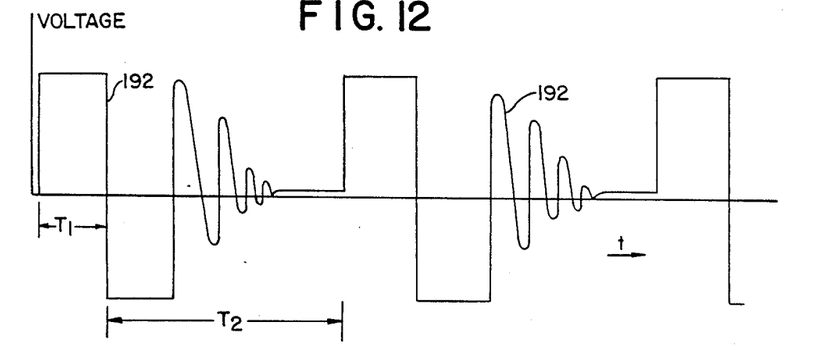
Figure 13:
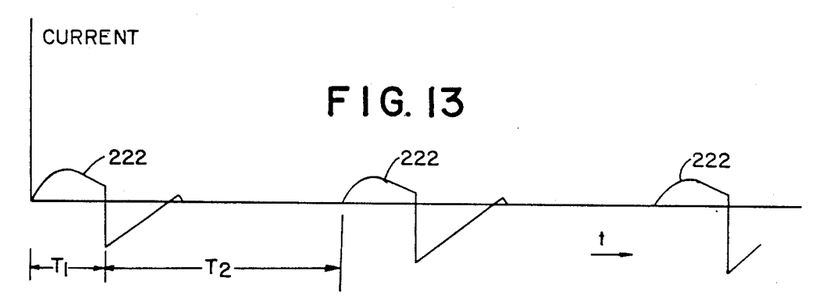

After the start-up period for the present switching power supply, the secondary voltage waveform 192 appears as shown in FIG. 12. The positive-going pulse-like portions of the waveform 192 occur during the forward mode of operation, whereas the negative-going pulses occur during the flyback mode of operation. During the flyback mode of operation, the voltage across the secondary 106 appears as a dampened oscillation that reduces to close to zero volt before the next forward mode of operation. In FIG. 13, during normal operation of the switching power supply, the waveform 222 represents the current flowing through the secondary current 106. Note that in the forward mode of operation this current has a positive magnitude, whereas in the flyback mode of operation the current steps down to a maximum negative magnitude, and then reduces in ramp-like fashion towards zero magnitude during the flyback mode of operation.

Various embodiments of the present invention are described herein for purposes of illustration, and are not meant to be limiting, and any variations of such embodiments that may occur to those of ordinary skill in the art, are meant to be included in the spirit and scope of the appended claims.

I claim:

1. A non-resonant switching power supply comprising:

a transformer including a primary winding, and a secondary winding, said windings each having a polarized end;

a first terminal for receiving a relatively low level positive DC voltage, said first terminal being connected to the polarized end of said primary winding;

a first capacitor of relatively large capacitance having one end connected to the polarized end of said secondary winding;

a first diode having a cathode electrode connected to the other end of said first capacitor, and an anode electrode connected to a source of reference potential;

a second diode having an anode electrode connected to the common connection of said first capacitor and said first diode, and a cathode electrode;

a second capacitor connected between the cathode electrode of said second diode and said source of reference potential;

an output terminal connected to the common connection of said second diode and second capacitor;

control means connected between the other end of said primary winding and a source of reference potential, for in an iterative manner alternately connecting the other end of said primary winding to said source of reference potential for a first period of time, for causing current to flow through said primary winding, in turn causing forward current to flow through said secondary winding, first capacitor, second diode, and second capacitor, for in an initial cycle of operation placing an initial charge on said second capacitor, and in subsequent cycles of operation charging said second capacitor to have a positive voltage level thereacross approaching the sum of the secondary winding voltage and the voltage across said first capacitor, said control means in each cycle of operation next operating to disconnect said primary winding from said source of reference potential for a second period of time, causing said current due to flyback energy in said secondary winding to flow through said first diode, first capacitor, and secondary winding in a direction opposite to that of the forward current flow, for in a non-resonant manner charging said first capacitor to develop thereacross a level of voltage approaching the level of the maximum fly-back voltage developed across said secondary winding; and said first capacitor being made large enough to not lose an excessive amount of charge during the time that forward current flows through said secondary winding for maintaining its contribution of current to a load connected between said output terminal and said source of reference potential, and maintaining the voltage level across the load.

2. The switching power supply of claim 1, wherein said control means further includes regulating means for in each cycle of operation adjusting the first and second periods of time, for maintaining a desired level of positive voltage at said output terminal.

3. The switching power supply of claim 2, wherein said regulating means includes:

switching means having a main current path normally having a relatively high impedance connected between the other end of said primary winding and said source of reference potential, and a control terminal for receiving a control signal, said switching means being responsive to said control signal for turning on to substantially reduce the impedance of its main current path, thereby permitting primary current to flow; and sensing means for sensing the level of said output voltage, for applying said control signal to said control terminal of said switching means for an increased said first period of time whenever said output voltage is below a desired level, and for a decreased said first period of time whenever said output voltage is above the desired level, in each successive cycle of operation.

4. The switching power supply of claim 3, wherein said sensing means includes:

first and second resistors connected in series between said output terminal and said source of reference potential; and pulse width modulator means having an input terminal connected to the common connection of said first and second capacitors, and a pulse output terminal connected to said control terminal of said switching means, for generating an output pulse as said control signal having a pulse width that is directly proportional to the extent of deviation of sensed output voltages below a desired level, and indirectly proportional to the extent of deviation of the level of sensed output voltages above a desired level, the pulse width of said control signal being equivalent to the first period of time in each cycle of operation.

5. The switching power supply of claim 3, wherein said switching means includes a pair of transistors having respective main current paths connected in parallel, and respective control electrodes connected in common to said control terminal.

6. The switching power supply of claim 5, wherein said pair of transistors are each a field effect transistor having a gate electrode for said control electrode.

7. The switching power supply of claim 1, further including high-frequency filter means connected directly across said secondary winding.

8. The switching power supply of claim 7, wherein said high-frequency filter means includes a third capacitor connected in series with a resistor.

9. The switching power supply of claim 1, further including snubber circuit means connected directly across said primary winding.

10. The switching power supply of claim 9, wherein said snubber circuit means includes:

a Schottky diode having a cathode electrode connected to the polarized end of said primary winding, and an anode electrode;

a resistor connected between said anode electrode and the other end of said primary winding; and a third capacitor connected in parallel with said resistor.

11. The switching power supply of claim 1, further including soft-start means for limiting the value of said first period of time during a predetermined start-up period initiating operation of s id switching power supply.

12. The switching power supply of claim 1, wherein the number of turns of said secondary winding are greater than the number of turns of said primary winding, for stepping-up the voltage applied across said primary winding.

13. The switching power supply of claim 12, wherein the turns ratio of said transformer is 7:1.

14. The switching power supply of claim 1, wherein said control means includes means for applying a controlled voltage pulse across said primary winding during each first period of time of successive cycles of operation.

15. The switching power supply of claim 14, wherein said transformer consists of a step-up transformer for amplifying the voltage pulses applied across said primary winding.

16. The switching power supply of claim 1, wherein said control means further includes means for sensing the level of said output voltage, for controlling the value of said first period of time during each cycle of operation, for maintaining the level of said output voltage at a desired level via closed loop control.

17. The switching power supply of claim 1, wherein said first and second capacitors are equal in capacitance.

18. In a non-resonant switching mode power supply including a step-up transformer having a primary winding and a secondary winding, the windings being polarized so that current flowing into a dot end of the primary causes current to flow out a dot end of the secondary winding, a first capacitor of relatively large capacitance connected at one end to the dot end of said secondary winding, a first diode having a cathode electrode connected to the other end of said first capacitor, and an anode electrode connected to a source of reference potential, a second diode having an anode electrode connected to the common connection of said first capacitor and first diode, said second diode having a cathode electrode connected in common to a voltage output terminal and one end of a second capacitor, the other end of said secondary winding and second capacitor being connected to said source of reference potential, the dot end of said primary winding being connected to a source of positive DC voltage, and a transistorized switching circuit connected between the other end of said primary winding and said source of reference potential, operable for selectively connecting a relatively low-impedance current path therebetween for allowing current to flow from said source of positive DC voltage through said primary winding to said source of reference potential, the method comprising the steps of:
(A) initially turning on said switching circuit for a first predetermined period of time during a one-half cycle of operation, for applying a voltage pulse across said primary winding, for causing current to flow from said secondary winding through said first capacitor, second diode, and second capacitor, for initially charging said second capacitor to have a nominal voltage thereacross;
(B) turning off for a second period of time said switching circuit immediately after said first period of time, until the next cycle of operation, for inducing fly-back energy into said secondary winding for causing current to flow from said source of reference potential, through said first diode, first capacitor and secondary winding, for non-resonantly charging said first capacitor to have a voltage thereacross approaching the maximum level of the negative voltage developed across said secondary winding due to the fly-back energy developed therein;
(C) turning said switching circuit back on for initiating another cycle of operation, for another first period of time, for charging said second capacitor to develop thereacross a positive voltage relative to said source of reference potential, approaching a level equal to the sum of the secondary voltage and voltage across said first capacitor; and
(D) iteratively repeating steps (B) and (C) to build up the charge on said second capacitor in a step-wise manner until a desired level of output voltage is obtained.

19. The method of claim 18, further including the step of sensing the level of said output voltage for adjusting said first period of time during each successive cycle of operation for maintaining the level of said output voltage at a desired level.

20. The method of claim 19, wherein said sensing step includes the steps of decreasing within a range said first period of time in a next cycle of operation, whenever the level of said output voltage is above a desirable level, and of increasing within a range said first period of time in a next cycle of 21. In a non-resonant switching power supply, the combination comprising:
a transformer including a primary and a secondary winding;
a first terminal for receiving a positive source of voltage, said first terminal being connected to one end of said primary winding;
switching means connected between the other end of said primary winding and a source of reference potential, for selectively connecting a low impedance current path therebetween;
a first capacitor having one end connected to one end of said secondary winding, another end of said secondary winding being connected to a source of reference potential, said first capacitor having a relatively large value of capacitance;
a first diode having a cathode electrode connected to another end of said first capacitor, and an anode electrode connected to a source reference potential;
a second diode having an anode electrode connected in common with the cathode electrode of said first diode and said another end of said first capacitor, and a cathode electrode;
a second capacitor connected between the cathode electrode of said second diode and a source of reference potential;
an output terminal connected to the common connection between said second diode and second capacitor; and
control means for successively and iteratively operating said switching means (1) to turn on for a first predetermined period of time for connecting a low impedance current path between the other end of said primary winding and said source of reference potential, causing current to flow through said primary winding, said secondary winding being polarized relative to said primary winding for at this time causing current to flow from said secondary winding through said first and second capacitors, and said second diode, for charging said second capacitor, and (2) to turn off for a second predetermined period of time for causing fly-back energy in said secondary winding to cause current to flow from said source of reference potential through said first diode, said first capacitor, and said secondary winding, for non-resonantly charging said first capacitor to a positive voltage relative to said first diode, the level of the positive voltage being substantially equal to the level of the relatively negative flyback voltage, and (3) to turn back on for a third predetermined period for causing forward current to flow in and secondary winding, through said first and second capacitors, and said second diode, for charging said second capacitor to have a voltage thereacross approaching the sum of voltage across said secondary winding and first capacitor at this time.

22. A non-resonant switching power supply comprising:
   a step-up transformer including a primary winding and a secondary winding having one end connected to a source of reference potential;
   pulse generating means for applying a voltage pulse across said primary winding for a first period of time, and terminating the voltage pulse for an immediately following second period of time over each cycle of operation;
   a shuttle capacitor having a relatively large valve of capacitance;
   an output capacitor having one end connected to said source of reference potential;
   means for connecting, during said first period of time, said secondary winding in series with said shuttle capacitor and said output capacitor, for charging said output capacitor to a voltage level thereacross approaching the voltage across the combination of said shuttle capacitor and secondary winding; and
   means for connecting only said shuttle capacitor in series with said secondary winding during said second period of time, for non-resonantly charging said shuttle capacitor via charging current resulting from fly-back energy developed in said secondary winding upon termination of said first period of time.

23. The switching power supply of claim 22 further including:
   closed loop control means including means for sensing the level of the output voltage across said output capacitor, connected to said pulse generating means for controlling the length of said first and second periods of time over each successive cycle of operation, for maintaining the level of voltage across said output capacitor at a desired level.

* * * * *

UNITED STATES PATENT AND TRADEMARK OFFICE
CERTIFICATE OF CORRECTION

PATENT NO. : 4,890,210

DATED : December 26, 1989

INVENTOR(S) : Howard M. Myers

It is certified that error appears in the above-identified patent and that said Letters Patent is hereby corrected as shown below:

Column 18, line 18, claim 20, after "cycle of" insert
--operation, whenever the level of said
  output voltage is below the desired level.--.

Signed and Sealed this

Eighth Day of January, 1991

Attest:

HARRY F. MANBECK, JR.

Attesting Officer

Commissioner of Patents and Trademarks